United States Patent
Razzano et al.

(10) Patent No.: US 11,295,361 B2
(45) Date of Patent: Apr. 5, 2022

(54) SYSTEMS AND METHODS FOR INCREMENTAL LEAD QUEUING

(71) Applicant: Cox Automotive, Inc., Atlanta, GA (US)

(72) Inventors: Kellen Gregory Razzano, Irvine, CA (US); Chao-Hsi Peron Lee, Irvine, CA (US); Cameron Alexander Mar, Irvine, CA (US)

(73) Assignee: Cox Communications, Inc., Atlanta, GA (US)

( * ) Notice: Subject to any disclaimer, the term of this patent is extended or adjusted under 35 U.S.C. 154(b) by 141 days.

(21) Appl. No.: 16/567,185

(22) Filed: Sep. 11, 2019

(65) Prior Publication Data
US 2021/0073879 A1 Mar. 11, 2021

(51) Int. Cl.
*G06Q 30/06* (2012.01)
*G06F 3/0481* (2013.01)
*H04L 29/08* (2006.01)
*H04L 67/141* (2022.01)

(52) U.S. Cl.
CPC ....... *G06Q 30/0601* (2013.01); *G06F 3/0481* (2013.01); *H04L 67/141* (2013.01)

(58) Field of Classification Search
CPC .. G06Q 30/0601; G06F 3/0481; H04L 67/141
See application file for complete search history.

(56) References Cited

U.S. PATENT DOCUMENTS

| | | | | |
|---|---|---|---|---|
| 7,188,176 B1* | 3/2007 | Nedderman | .......... | G06F 16/958 709/227 |
| 8,370,464 B1* | 2/2013 | Chitilian | ............ | H04L 29/08072 709/220 |
| 8,812,625 B1* | 8/2014 | Chitilian | ............... | G06F 40/197 709/220 |
| 2005/0071172 A1* | 3/2005 | James | ..................... | G06F 3/167 704/275 |
| 2005/0278231 A1* | 12/2005 | Teeter | ................ | G06Q 30/0641 705/14.51 |

(Continued)

OTHER PUBLICATIONS

Alexander Kaupanin, "Auto-Save User's Input In Your Forms With HMTL5 and Sisyphus.js", published on Dec. 5, 2011 to https://www.smashingmagazine.com/2011/12/sisyphus-js-client-side-drafts-and-more/, retrieved Sep. 2, 2021 (Year: 2011).*

(Continued)

*Primary Examiner* — Shourjo Dasgupta
(74) *Attorney, Agent, or Firm* — Eversheds Sutherland (US) LLP

(57) ABSTRACT

Systems and methods are provided herein for systems and methods for incremental lead queuing. In some embodiments, the systems and methods may involve receiving an indication that an information input session is initiated at a first time. The information input session may include a set of input fields, and information may be received for a portion of the input fields. After a threshold period of time without either receiving any additional information input, or without all of the set of input fields being completed, a determination may be made that a timer has expired and the information that has been received thus far may be compiled and sent to be provided as a partial lead.

19 Claims, 8 Drawing Sheets

(56) References Cited

U.S. PATENT DOCUMENTS

| | | | | |
|---|---|---|---|---|
| 2006/0136593 | A1* | 6/2006 | Silky | G06F 9/451 |
| | | | | 709/227 |
| 2007/0186150 | A1* | 8/2007 | Rao | G06F 40/174 |
| | | | | 715/205 |
| 2008/0059485 | A1* | 3/2008 | Finn | G06Q 10/10 |
| 2013/0231980 | A1* | 9/2013 | Elgart | G06Q 50/20 |
| | | | | 705/7.38 |
| 2018/0091546 | A1* | 3/2018 | Davidson | G06F 40/14 |
| 2019/0361754 | A1* | 11/2019 | Breijo Baullosa | G06F 9/542 |

OTHER PUBLICATIONS

"Allowing Users to Save & Resume Forms", published on Nov. 10, 2018 to https://help.formstack.com/hc/en-us/articles/360019204632-Allowing-Users-to-Save-Resume-Forms, retrieved Sep. 2, 2021 (Year: 2018).*

"Track Form Abandonment With Google Tag Manager", published on Jul. 24, 2015 to https://www.simohava.com/analytics/track-form-abandonment-with-google-tag-manager/, retrieved Sep. 2, 2021 (Year: 2015).*

"Save form without leaving OR patch onchange without refreshing", published on Nov. 8, 2017 to https://powerusers.microsoft.com/t5/Building-Power-Apps/Save-form-without-leaving-OR-patch-onchange-without-refreshing/td-p/68213, retrieved Sep. 2, 2021 (Year: 2017).*

"Save and Continue Partial Submissions", published on Jun. 5, 2019 to https://formidableforms.com/features/save-and-continue-partial-submissions/, retrieved Sep. 2, 2021 (Year: 2019).*

"Prevent partial and incomplete survey responses", published on May 2, 2012 to https://www.questionpro.com/blog/prevent-partial-and-incomplete-survey-responses/, retrieved Sep. 2, 2021 (Year: 2012).*

"How to handle session timeouts as a user is saving a form?", published on Dec. 31, 2013 to https://stackoverflow.com/questions/20844909/how-to-handle-session-timeouts-as-a-user-is-saving-a-form, retrieved Sep. 2, 2021 (Year: 2013).*

Quay Morgan, "Introducing Save Progress for Ninja Forms 3.0!", published on May 24, 2017 to https://ninjaforms.com/blog/introducting-save-progress/, retrieved Sep. 2, 2021 (Year: 2017).*

* cited by examiner

Mesa Grande Auto Group - Demo Site has teamed up with Book to give you a free Trade-in Value Report on your vehicle. How?

It's simple:
○ Tell us about your vehicle

Which car are you trading in? ⎬ 604

How many miles driven?

[Mileage] [Next]
   606      608

Book Trade-in Range
$24,959 - $27,306

Here's what we have so far:
⊙ Year: 2016
⊙ Make: Audi ← 610
⊙ Model: Q5
⊙ Style: 3.0T Premium Plus Sports Utility 4D
⊙ Engine: V6, Supercharged, 3.0 Liter
⊙ Transmission: Auto, 8-Spd Tiptronic Spt
⊙ Drivetrain: AWD ⇘
○ Mileage:
○ Equipment:
○ Next Vehicle:

SYSTEMS AND METHODS FOR INCREMENTAL LEAD QUEUING

TECHNICAL FIELD

The present disclosure relates to systems and methods for incremental lead queuing and more particularly to lead generation when receiving only partial lead information.

BACKGROUND

Lead generation may generally be a process through which information is obtained about a potential sales opportunity. As one example, a lead for a vehicle sale and/or purchase may include information such as the potential customer's personal information, the make, model, and year of the vehicle, and any other information pertaining to the vehicle. Such information may be obtained as the result of information input by the potential customer into a web or mobile phone application including input fields for providing such information. As a specific example, a potential customer may input such information into the application in order to receive a quoted valuation of the vehicle they may then take to a dealership for sale. This information may also be provided to the dealerships in the form of a lead that the dealership may then use to reach out to the potential customer with a sales opportunity. However, potential customers may often fail to complete all of the input fields required to produce a full lead for a number of reasons, such as a loss of interest in providing the information if multiple pages of input fields are involved. In such scenarios, the opportunity to generate a lead is lost because a complete set of information was not provided.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 6A-6B depict example user interfaces in accordance with one or more example embodiments of the disclosure.

DETAILED DESCRIPTION

Overview

Figure 1:
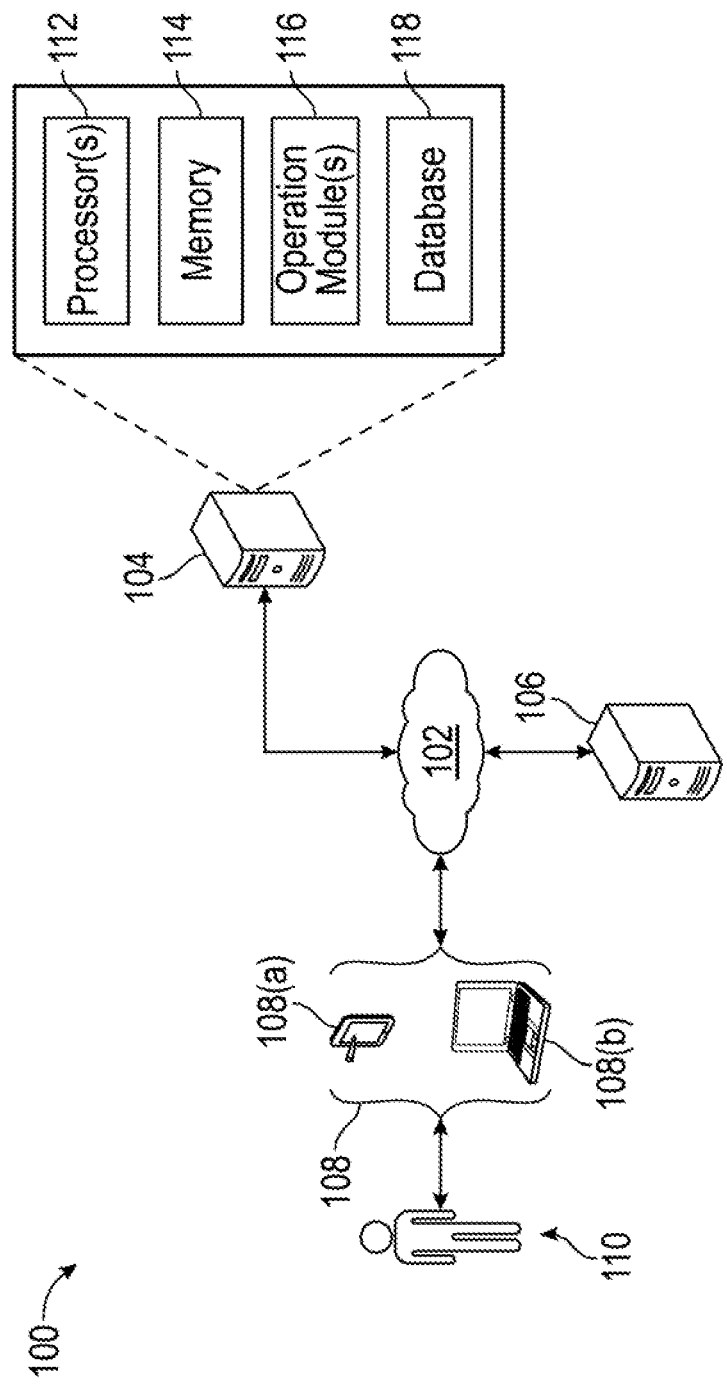
FIG. 1 depicts an illustrative architecture in accordance with one or more example embodiments of the disclosure.

The disclosure is directed to, among other things, systems and methods for incremental lead queuing. In some embodiments, the systems and methods described herein may involve capturing partial lead information for a potential customer even if the customer fails to provide all of the necessary information to create a full lead. Generally speaking, a lead may be a compilation of information that assists an individual or business in initiating or performing a potential transaction. For example, a lead may include information about a person who desires to sell an item, such as vehicle. The information may include contact information for the person and information about the specific vehicle itself. A business may use the lead to contact the person and make an offer tailored to the person based on the information in the lead. In some instances, such leads may be associated with web and/or application-based lead generation sessions. However, the systems and methods described herein may similarly be applied in any scenario involving lead generation, or more generally, scenarios involving one or more input fields for receiving information from a user where the user fails to input all of the information associated with the input fields. For example, when the user begins providing information to the input fields, but fails to completely fill out and/or submit the input fields. This may prevent the complete loss of a potential lead, as partial information associated with the potential lead may be preferable to no information, and no lead, at all.

In some embodiments, the one or more input fields may be associated with an information input session. As one example, an information input session may include a vehicle trade-in advisor application, in which a user inputs personal information, as well as information about a vehicle they wish to trade in, the user submits the information, and the trade-in advisor provides a trade-in quote for the vehicle based on the information about the vehicle (for example, as depicted in the user interfaces of FIGS. 5 and 6A-6B). In such an example, a lead may be generated for use by dealerships to contact the user to propose a potential trade in or purchase of the vehicle based on the information provided. However, this is merely an example, and is not intended to be limiting. An informational input session may similarly include any other situation in which information is received from a user. That is, a lead may be generated for any item. Additionally, reference may be made herein to a "person," "user," "customer," or the like, and these terms should be understood to refer to the same individual.

As an overview, items may be any products or services that may be sold or exchanged including, for example, and without limitation, vehicles, vehicle parts, computer products, firearms, articles of clothing, gemstones, jewelry, consumer electronics, electronics parts, yard appliances, construction machines and equipment, aircrafts, boats, office equipment, furniture, manufacturing equipment, packaging equipment, kitchen equipment, appliances, raw materials, mineral rights, water rights, combinations of the foregoing, or the like, or related products and components. While many of the embodiments of this Detailed Description are described in terms of vehicles, those of skill in the art will understand that the disclosure is not so-limited, and other products, as described herein, could be substituted for vehicles.

The information input session may include one page of input fields or multiple pages of input fields, so that a user is required to provide information for a at least one input field on a first page before being provided one or more additional input fields on a second page, one or more additional input fields on a third page, and so on. For example, in the exemplary vehicle trade-in advisor information input session, a first page may include fields pertaining to the user's personal information, such as their name, email address, zip code, etc. The second page, and subsequent pages, may include fields relating to the vehicle in question, or any other information that may be relevant to a trade-in evaluation. The user may be able to switch between pages by selecting or otherwise interacting with an element found within the information input session, such as a "next" button on a web browser. The information input session may also include, on a final page, an element, such as a button, that the user may select to submit all of the information provided to the input fields (e.g., to create a full including information relating to some or all of the input fields). In some embodiments, however, the information input session may only include a single page of input fields.

The information input session may also include a unique session identifier used to identify the particular information input session and associated information (for example, information provided for a set of input fields) provided by the user. For example, the unique session identifier may include a number value, string of characters, or any other identifying information. In some instances, the unique session identifier may only be created for the information input session once the user provides information to a preliminary page of input fields. For example, the preliminary page may include input fields pertaining to the user's personal information, such as their name and email address. If the user provides the information for these input fields and selects an element, such as a button, indicating that they wish continue with the information input session (e.g., continue to a second page of input fields), then the unique session identifier may then be established for the information input session. The unique session identifier may only be established at this point to ensure that the user has a threshold level of interest in completing the entire information input session. Otherwise, there may not be enough information to form even a sufficient partial lead.

In some instances, a user may not reach the final page and select the element that allows all of the information provided to the input fields to be submitted (or more generally, may simply not complete all of the input fields in an information input session). Thus, any information that the user did input into the input fields is lost. To mitigate this occurrence, the partial information that the user did provide may be captured. In some embodiments, to effectuate partial information capture even if the user does not complete all of the input fields and manually submit the information, the information input session may involve the use of a timer for tracking the amount of time that has passed since the user last interacted with the informational input session, or the amount of time since the user last selected an element on a previous page of input fields to move to a subsequent page of input fields (e.g., click a next button to move from a first page to a second page of input fields). The timer may first be initiated upon the user providing information for the preliminary input fields and selecting the element for indicating that the information is complete and/or when the unique session identifier is created. That is, the timer starts when it is determined that the user had provided sufficient information to indicate a threshold level of interest in completing enough information to generate a satisfactory partial or full lead. In some instances, the timer may continue to run until a user has completed input fields on a particular page and selected an element on the page to indicate that they are finishing filling in the input fields on that particular page and want to continue to the next page of input fields. For example, the user may provide information for input fields pertaining to a vehicle make/model/year and then hit a "next" button to be presented a new set of input fields. Once the new set of input fields is provided, the timer may reset and start counting again from zero. This process may continue iteratively until all of the input fields of the information input session have been completed and the element on the final page has been selected to submit all of the information.

In some embodiments, the timer may function through the use of a timestamp that is saved and indicates the particular time at which the preliminary page of input fields was completed and an element was selected to receive a new set of input fields. Once the timestamp is saved, a local or external system may check at regular intervals to determine if the threshold amount of time has passed. A new timestamp may be created every time a page or set of input fields is completed, or the previous timestamp may simply be replaced. In some embodiments, the timer may be in the form of an incremental counter, and no timestamp may be used. A combination of an incremental counter and a timestamp may also be used. In some embodiments, any other method of tracking whether a threshold amount of time has passed since an element was selected to receive a new set of input fields may be used. The timer may be saved separately from any other timers associated with other information input sessions so that each timer may be individually monitored. That is, at any given time any number of information input sessions and associated timers may be active.

In some embodiments, the timer maybe used to determine a threshold amount of time a user has to complete a particular set of input fields before the information the user has provided is taken and submitted as a partial lead (for example, if the user exits the information input session or leaves the information input session open but merely fails to provide information to the input fields for a threshold amount of time). For example, the timer may run until a threshold amount of five minutes has passed since either the user has provided any input to the information input session and/or since the user has filled a set of input fields and selected an element to move on to a new set of input fields, even if the user is interacting with the information input session. However, any other amount of threshold time may be used. Once the timer has reached the threshold amount of time, all of the information provided up until that point is compiled and used to generate a partial lead. This lead may then be delivered to a third party, such as a dealer, who may use the lead to pursue a sales opportunity, for example.

In some embodiments information provided to the input fields of the information input session may be stored in in a local or remote location, such as a server, during the information input session (the server may be the same as the a lead delivery and monitoring system 104 described below). For example, the information may be stored in a leads table located at the local or remote location. The leads table may also be located separately from the server such that the server may receive the information and provide it to the leads table at the separate location (or the leads table may also be located within the server). The leads table may be a section of a database that holds the information provided to the input fields of the information input session. When the preliminary information for the first page of input fields is provided and the element is selected, the preliminary information and unique session identifier associated with the information input session may be sent to and stored at the server. The timer may also be stored at the server along with the preliminary information and the unique session identifier. Once a first set of input fields are completed, the information provided for the first set of input fields may be stored at the server along with the preliminary information, and the unique session identifier and a new timer may be created and stored at the server. Alternatively, the same timer may be used and simply reset. Once the timer reaches the threshold time or all of the information for all of the input fields has been provided, the information stored at the server may be used to generate a lead associated with the unique session identifier. In some embodiments, the server may be provided real-time information updates such that information provided to the input fields is saved to the server as it is provided instead of waiting for an entire set of input fields to be completed before saving at the server. The information may also only be saved to the server upon completion of an entire set of input fields unless the timer has reached the threshold amount of time, and then at that point the information that has been provided up until that point may be saved to the sever, or may simply be complied to add to the generated lead.

Once the timer has reached the threshold amount of time or all information has been provided for all of the input fields and the element on the final page has been selected to indicate that the information input session is complete, the provided information may be compiled into a lead. To compile the information to generate the lead, information may be obtained from where it is saved at the local or remote location, such as at the server and/or the leads table. The information that has been provided for a current page of input fields, may also be acquired if it has not yet been sent to the server for storage. However, in some instances such information may be sent to the server for storage in real-time, such that all of the provided information merely needs to be obtained from the server. Once all of the information provided during the information input session has been obtained, it may be combined into a single source of information as the lead. The lead may then be sent to a third party, such as a business, for use in pursuing a potential transactional opportunity with the user who provided the information found within the lead.

The storage of information within the server and/or leads table may only be temporary. Once the information input session has ended and the provided information is compiled into a lead and sent to the third party, the information stored in the server and/or leads table may be deleted.

Illustrative Embodiments

Turning now to the drawings, FIG. 1 depicts an illustrative architecture 100 in which techniques and structures of the present disclosure may be implemented. The illustrative architecture 100 may include a communications network 102, a lead delivery and monitoring system 104, a third party system 106, and one or more devices 108, including, for example, a mobile device 108(a), computer 108(b), or any other type of device operable by a user 110.

In some embodiments, the communications network 102 may include, but is not limited to, any one or a combination of different types of suitable communications networks such as, for example, cable networks, public networks (e.g., the Internet), private networks, wireless networks, cellular networks, or any other suitable private and/or public networks. Further, the network 102 may have any suitable communication range associated therewith and may include, for example, global networks (e.g., the Internet), metropolitan area networks (MANs), wide area networks (WANs), local area networks (LANs), or personal area networks (PANs). In addition, the network 102 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof. In some instances, the communications network 102 may include cellular (e.g., 5G), Wi-Fi, or Wi-Fi direct.

In some embodiments, the lead delivery and monitoring system 104 may comprise at least one or more processor(s) 112, memory 114, one or more lead delivery and monitoring modules 116, and a database 118. In some embodiments, the functionality of the module(s) described herein (for example, the lead delivery and monitoring modules 116) may also be implemented as a single module or any other number of module(s).

In some embodiments, the lead delivery and monitoring system 104 may include one or more processors 112 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 114 as needed for execution. The processor 112 may be configured to execute the computer-executable instructions to cause various operations to be performed. Each processor 112 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 114 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 114 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The lead delivery and monitoring modules 116 may perform operations including at least receiving an indication that an information input session is initiated at a first time, wherein the information input session comprises a first set of input fields. In some embodiments, the indication that the information input session is initiated may be triggered by a user providing information for an preliminary set of input fields, and an element on the first page being selected, such as a "next" button, for example. At this point, a unique session identifier may be created for the information input session, and the unique session identifier, information provided for the preliminary set of input fields, and a timer, may be saved. The timer may begin at the first time and may be in the form of a timestamp reflecting the first time. The timer may also be in any other form, for example the timer may simply be in the form of an incremental counter that begins at the first time.

The operations may also include receiving information associated with a portion of the first set of input fields. The first set of input fields may be the input fields presented after the user provides information for the preliminary set of input fields and the unique session identifier is created for the information input session. For example, in the vehicle trade-in advisor scenario, the first set of input fields may be directed to information about the vehicle the quote is being determined for. The first set of input fields may be directed to a particular subset of information pertaining to the vehicle, such as its make, model, and/or year. This is merely an example, however, and the first set of input fields may cover a wide range of information, and also does not to be limited to a vehicle trade-in advisor.

The operations may also include determining that a threshold amount of time has passed since the first time. The threshold amount of time passing may be an indication that a user has stopped providing information to the information input session for any number of reasons. For example, the user could have exited the information input session. The determination that the threshold amount of time has passed may be made based on the timer that is created every time a set of input fields are completed and an element is selected to indicate that a user desired to view a subsequent set of input fields. As disclosed herein, the timer may be in the form of a timestamp or an incremental counter, to list two examples.

The operations may also include providing, based on the determination that the threshold amount of time has passed since the first time, the information associated with a set of completed fields, wherein the set of completed fields comprises the portion of the first set of input fields. When the threshold amount of time has passed, it is determined that the user is likely not going to complete the information input session, and that the information that has already been provided should be salvaged to form a partial lead. Thus, the set(s) of input fields that have already been completed, as well as the information provided for the current set of input fields, should be collected and provided to generate a lead. This information may, for example, be provided to a lead generation system that takes the information as an input and generates a partial lead including the information as an output. The lead generation system may either be internal or external to the location at which the information is originally stored. The lead delivery and monitoring modules 116 may also perform any number of further operations described herein.

In some embodiments, the database 118 may include a local or external system for storing information associated with an information input session, such as, for example, a unique session identifier, a timer, and information provided for input fields of the information input session. For example, the database 118 may include the leads table, or any number of leads tables.

In some embodiments, the third party system 106 may be any system external to the lead delivery and monitoring system 104. For example, the third party system 106 may be the recipient of the completed or partial lead after the information input session is completed. For example, the third party system 106 may be associated with a business that desires to use the lead to pursue a potential transactional opportunity with the user providing the information for the information input session.

In some embodiments, the device 108 may be a device operable by a user 110 to interact with an information input session. For example, the device may be a mobile device 108(a), such as a mobile phone, a laptop 108(b), or any other device useable for the purposes of viewing an information input session and inputting information into the input fields. As such, the device 108 may have the same hardware and modules to perform the same operations as the lead delivery and monitoring system 104. However, the device 108 may also simply serve to allow the user 110 to view the information input session and provide the information input, and the actual processing is performed at the lead delivery and monitoring system 104.

Figure 2:
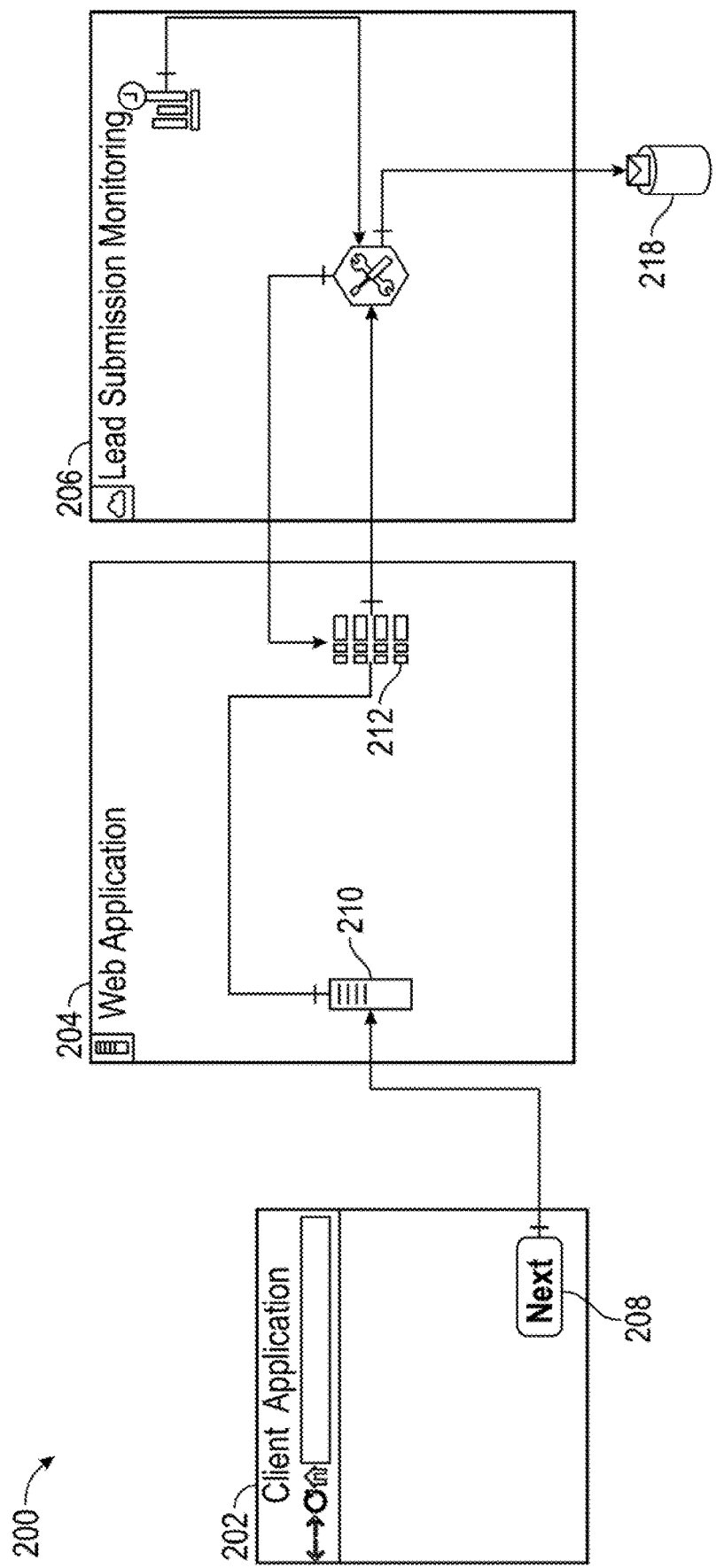
FIG. 2 depicts an example process flow in accordance with one or more example embodiments of the disclosure.

FIG. 2 depicts an example process flow 200 in accordance with one or more example embodiments of the disclosure. In some embodiments, the process flow may include a client application 202, a web application 204, and a lead submission monitoring system 206. The client application 202 may serve as the interface through which a user is able to interact with an information input session by providing information to input fields and/or selecting an element 208 (for example, a "next" button) to move to a new set of input fields. The client application may also include any other items necessary for the information input session. For example, the client application may include at least any items depicted in the user interfaces of FIGS. 5, 6A, and 6B. Although FIG. 2 depicts a client application 202, web application 204, and lead submission monitoring system 206, in some embodiments, the process flow 200 may include any combination of some or all of the client application 202, web application 204, and lead submission monitoring system 206. For example, in some embodiments, the process flow 200 may only include the web application 204 and the lead submission monitoring system 206.

Returning to the embodiment depicted in FIG. 2, once a user provides information to input fields on a particular page, and the element 208 is selected, the information provided to the information input session at the particular page may be sent to the web application 204 for temporary storage. For example, upon completion of an preliminary set of input fields at a first page, a unique session identifier may be created for the information input session and the information provided to the preliminary set of input fields may be sent to the web application 204 along with the unique session identifier that has been created for the particular information input session. Additionally, a timer may be created and sent for storage at the web application 204, or the timer may simply be created at the web application 204 or any other part of the process flow 200. In some instances, the information may be sent to a server 210 and/or a leads table 212, where the leads table 212 may be located within the server 210 or external to the server 210. In some instances, the server 210 may be an application host server or any other type of server. If the server 210 receives the information, then the server 210 may then store the received information at the leads table 212. Once the information for the first set of input fields and the unique session identifier are sent to the server 210 and stored at the leads table 212, any time an element 208 is selected on any subsequent page of input fields (e.g., a second set of input fields on a second page of the client application 202) the information provided for the input fields on that subsequent page is also sent to the server 210 and stored at the leads table 212 along with the unique session identifier and any information provided for input fields on prior pages.

In some embodiments, once a unique session identifier is created for an information input session and information is stored at the leads table 212, the lead submission monitoring system 206 may begin a monitoring process of the leads table 212. The monitoring process may involve the lead submission monitoring system 206 monitoring the timer associated with the unique session identifier for the particular information input session. For example, the timer may be in the form of a timestamp that is created when an element 208 is selected and information provided for a particular set of input fields is sent to the server 210. The lead submission monitoring system 206 may periodically, or in real-time, check the timer to determine whether a threshold amount of time has passed since the time identified in the timestamp. For example, a threshold amount of time may be five minutes, and the lead submission monitoring system 206 may query the timer every minute do determine if the timer has reached the threshold amount of time. However, any number of threshold amounts of time may be utilized. Once the threshold amount of time has passed, the lead submission monitoring system 206 may provide an indication for the web application 204 to compile all of the information currently stored for the unique session identifier for the particular information input session, and send the information to a lead delivery platform 218 to be formed into a partial or complete lead. In some instances, information may also be pulled from the client application that has been provided for input fields the user is currently presented with, but has not submitted yet. The timer may be reset (e.g., a new timestamp may be created) every time information associated with a new set of input fields is provided to the server 210 (e.g., a user completes all of the fields on a page and selects an element 208, such as a "next" button). In some embodiments, there may be multiple unique session identifiers associated with multiple information input sessions stored at the leads table 212, and the lead submission monitoring system 206 may monitor the various timestamps associated with each of the unique session identifiers.

Figure 3:
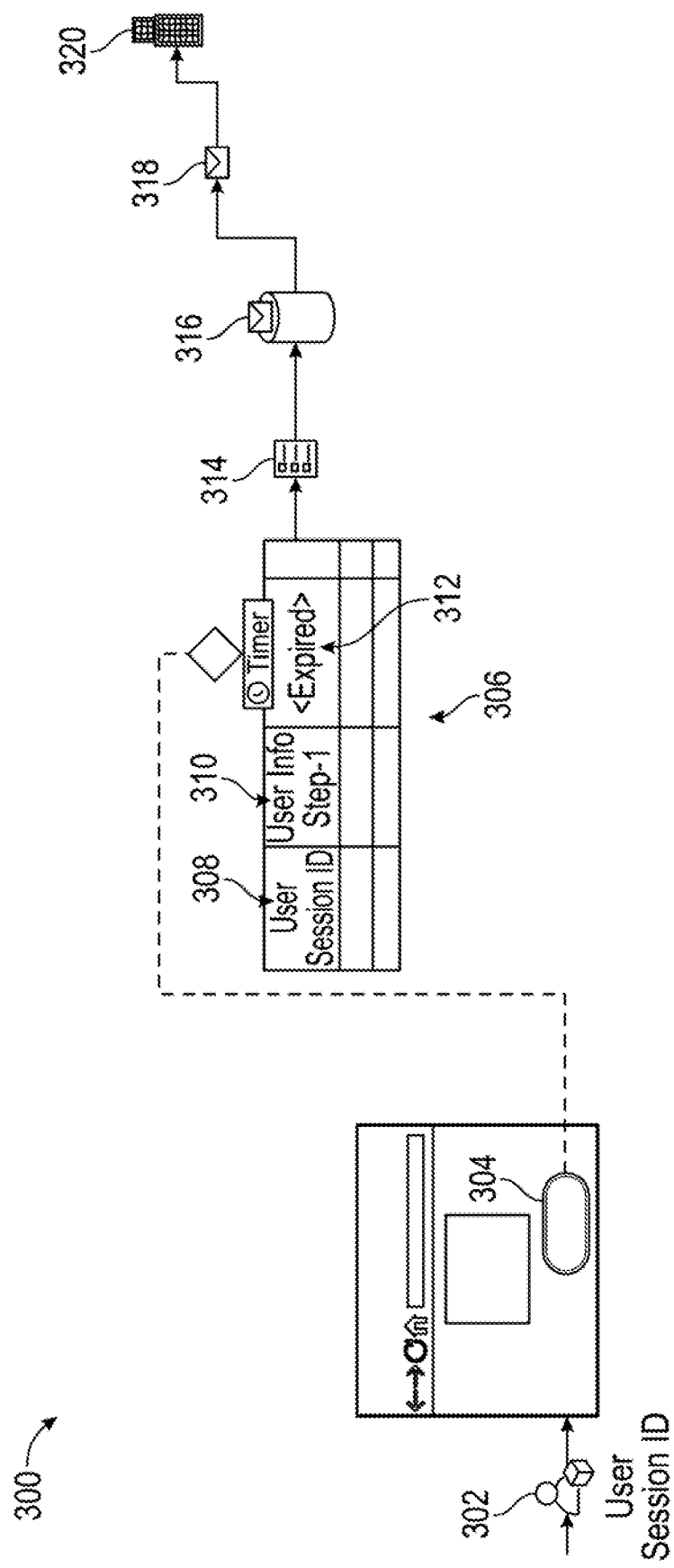
FIG. 3 depicts an example process flow in accordance with one or more example embodiments of the disclosure.

FIG. 3 depicts an example process flow 300 in accordance with one or more example embodiments of the disclosure. The example process flow 300 may be a specific use case example (e.g., a single information input session) of the process flow 200 outlined in FIG. 2, in which only partial information is provided during the information input session. The process flow 300 may begin with a unique session identifier 302 being created for the information input session. The unique session identifier 302 may be created in response to information being provided to an preliminary set of input fields and/or an element 304 being selected to indicate that the information provided for the preliminary set of input fields should be submitted. In some instances, the unique session identifier and information provided for the first set of input fields may be stored at a leads table 306, which may be the same as the leads table 212 depicted in FIG. 2. The unique session identifier 302 may be stored at a first location 308 in the leads table 306 and the information provided for the first set of input fields may be stored at a second location 310 in the leads table 306. A timer may also be created upon selection of the element 304. The timer may be stored at a third location 312 in the leads table 306. For example, the timer may be in the form of a timestamp indicating the time at which the element 304 was selected and the leads table 306 was initially filled with information associated with the information input session (e.g., the unique session identifier 302, information provided for the first set of input fields, etc.). Alternatively, all of the information may be stored at the same location in the leads table 306. The leads table 306 may be a table located within a database.

The particular use case of FIG. 3 shows the timer being expired, indicating that a threshold amount of time has passed since either the element 304 was initially selected and the unique session identifier was created for the information input session, or since any sort of input has been provided to the information input session. Once the timer is determined to be expired, all of the information (e.g., the unique session identifier 302, information provided for the first set of input fields, etc.) may be provided as a user information payload 314 to an internal system 316. The internal system 316 may be the same as the lead delivery platform 218 depicted with respect to FIG. 2. The internal system 316 may be responsible for delivering leads to specified dealers or other third parties. These third parties, for example, may be selected by the user during the information input session. In some embodiments, the internal system may be an internal lead delivery platform. From the internal system 316 a lead 318 may be created based on the information gathered during the information input session. In this use case, the lead 318 may be a partial lead as only some of the totality of the input fields were filled before the timer expired. Finally, the lead 318 may be provided to a third party 320 to use in pursuing a sales opportunity. For example, the lead 318 may contain information pertaining to a user who desires to sell their vehicle, and thus the lead 318 may be provided to one or more dealerships.

Figure 4:
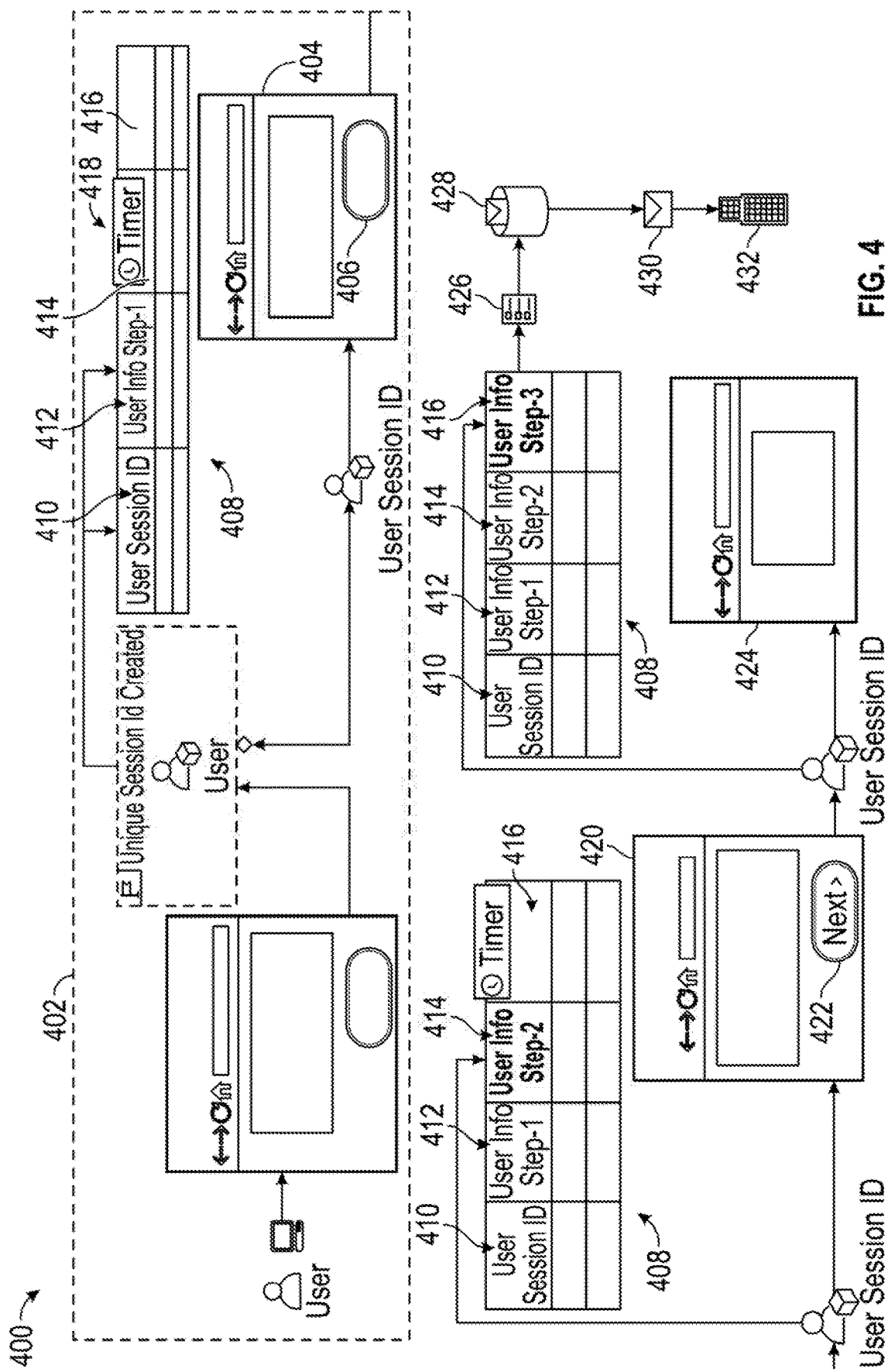
FIG. 4 depicts an example process flow in accordance with one or more example embodiments of the disclosure.

FIG. 4 depicts an example process flow 400 in accordance with one or more example embodiments of the disclosure. The example process flow 400 may be a specific use case example (e.g., a single information input session) of the process flow 200 outlined in FIG. 2, in which complete information is provided during the information input session. The example process flow 400 may begin with a sub-process flow 402, which may be the same or substantially the same process flow as process flow 300. Process flow 400 may be unique from process flow 300 in that the information input session continues beyond sub-process flow 402, and additional information is collected from a user. For example, process flow 400 may continue with sufficient information being provided for input fields at a second page 404 (instead of the timer running out at the second page and partial information being compiled for lead generation as is the case in process flow 300). Once information is provided to the input fields of the second page 404, an element 406 may be selected that indicates the information is completed and should be saved with the other information associated with the information input session. The information associated with the second set of input fields may then be stored at the leads table 408 at a third location 414 along with the unique session identifier at the first location 410 and the information associated with the first set of input fields at the second location 412. The leads table 408 may be the same as leads table 212 or 306. For example, the leads table 408 may be a table located within a database. Additionally, a new timer may be saved at a fourth location 416 and/or the original timer 418 that was created upon creation of the unique session identifier may simply be reset. Although FIG. 4 describes particular information as being stored in different locations within the leads table 408, any of the information may be stored in any portion of the leads table (for example, all of the information may be stored in one location, such as the first location 410).

In some embodiments, a third page 420 may be provided that includes a third set of input fields. Once information has been provided to the third set of input fields, and element 422 may be selected that indicates that the third set of input fields are completed and should be saved. Upon selection of the element 422, the information associated with the third set of input fields may be stored at the leads table 408 at the fourth location 416. In the example process flow 400, the third page 420 and third set of input fields may be the final page of input fields in the information input session. Thus, after the element 422 is selected and the information for the third set of input fields is stored at the leads table 408, a fourth page 424 maybe provided that indicates the information input session has been completed. The received information (unique session identifier, information associated with the first, second, and third input fields) may be compiled and provided as a user information payload 426 to an internal system 428. In some embodiments, the internal system 428 may be an internal lead delivery platform, but the internal system 428 may also be a temporary database. From the internal system 428 a lead 430 may be created based on the information gathered during the information input session. In this use case, the lead 430 may be a partial lead as only some of the totality of the input fields were filled before the timer expired. Finally, the lead 430 may be provided to a third party 432 to use in pursuing a sales opportunity. For example, the lead 430 may contain information pertaining to a user who desires to sell their vehicle, and thus the lead 430 may be provided to one or more dealerships. If it is determined at any point throughout example process 400 that a timer has expired (e.g., a threshold amount of time has passed since an element was selected) then the information that has been provided up until that point may be compiled and provided as a user information payload 426 and the information input session may cease (as is depicted in FIG. 3).

While FIG. 4, as well as another other figure described herein, may include references to multiple pages, including, for example, a first page, second page, and third page, the information input session may also simply include a single page that includes all of the input fields, or the same page may be refreshed with new input fields when a set of input fields is completed. Additionally, while reference may be made to a user selecting an element (such as element 422), such elements may not be present in a given information input session. That is, information may be provided to a user in any number of other manners, such as on a single page including all of the input fields as described above.

Figure 5:
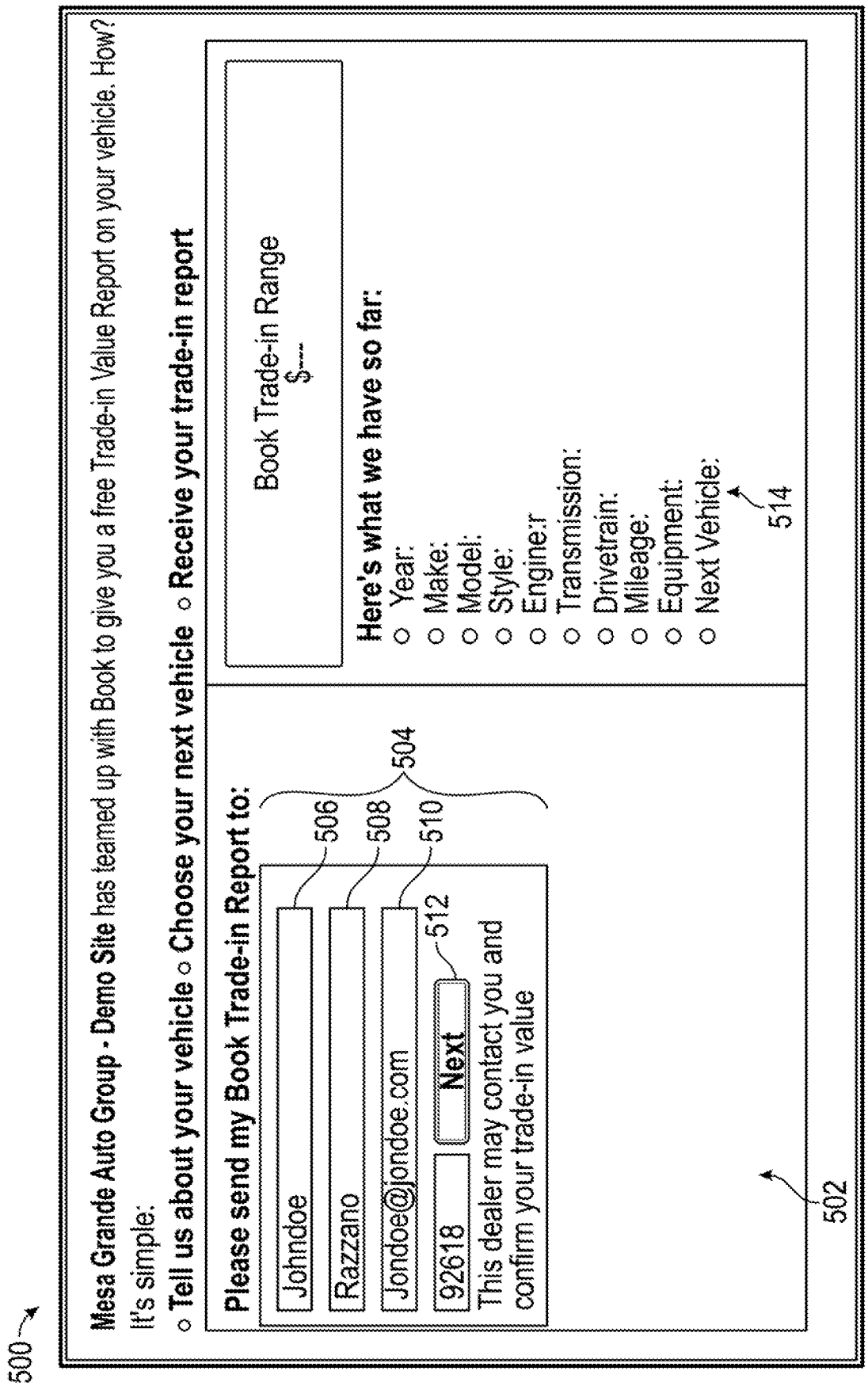
FIG. 5 depicts an example user interface in accordance with one or more example embodiments of the disclosure.

FIG. 5 depicts an example user interface 500 in accordance with one or more example embodiments of the disclosure. In some embodiments, the user interface 500 may depict an preliminary page 502 of input fields 504 that a user needs to provide information for to initiate an information input session. For example, the input fields 504 may include a first input field 506, a second input field 508, a third input field 510, as well as any number of additional input fields. In FIG. 5, the input fields are depicted as pertaining to personal information for the user, such as the user's name, email address, and zip code. However, this is merely an example, and any other type of information may be provided to the input fields 504. The user interface 500 may also include an element 512 that may be selected to indicate that the information provided to the input fields 504 should be saved (e.g., sent to server 210 as depicted in FIG. 2). In some instances, and as depicted in FIG. 5, the element may be in the form of a "next" button. However, the element 512 may also be any other type of element that a user may interact with to indicate an intention to submit the information provided on the first page. Once the button is selected, a new set of input fields may be provided on a second page. The user interface 500 may also include a section 514 identifying the portion of information that has already been provided to the information input session, and how much information is left to be provided to complete the entirety of the information input session.

FIG. 6A depicts an example user interface 600 in accordance with one or more example embodiments of the disclosure. In some embodiments, the user interface 600 may be a second page 602 of input fields 604 for an information input session. For example, the input fields 604 may include a first input field 606, as well as any number of additional input fields. In FIG. 6A, the input fields are depicted as pertaining to vehicle mileage for the specific use case of the information input session pertaining to obtaining a quote for a vehicle sale. However, this is merely an example, and any other type of information may be provided to the input fields 604. The user interface 600 may also include an element 608 that may be selected to indicate that the information provided to the input fields 604 should be saved (e.g., sent to server 210 as depicted in FIG. 2). In some instances, and as depicted in FIG. 6A, the element may be in the form of a "next" button. However, the element 608 may also be any other type of element that a user may interact with to indicate an intention to submit the information provided on the second page. Once the button is selected, a new set of input fields may be provided on a third page. The user interface 600, similar to the user interface 500, may include a section 610 identifying the portion of information that has already been provided to the information input session, and how much information is left to be provided to complete the entirety of the information input session. The section 610 may indicate that information for the input fields on any previous pages (for example, information associated with the first input fields 506, second input fields 508, and third input field 510) has already been provided.

Figure 6B:
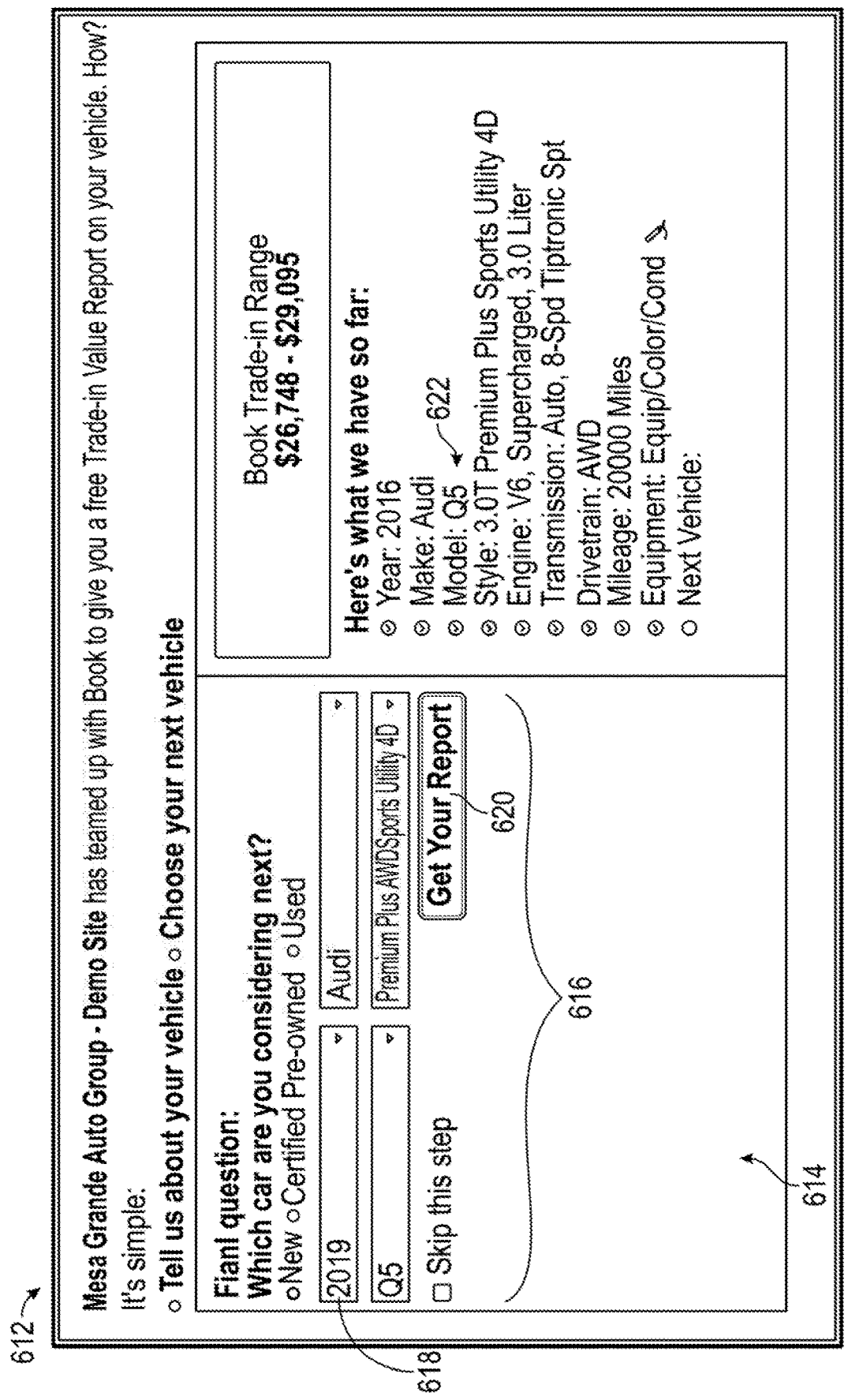

FIG. 6B depicts an example user interface 612 in accordance with one or more example embodiments of the disclosure. In some embodiments, the user interface 612 may be a third page 614 of input fields 616 for an information input session. For example, the input fields 616 may include a first input field 618, as well as any number of additional input fields. In FIG. 6B, the input fields are depicted as pertaining to information such as the make/model/year of a vehicle for the specific use case of the information input session pertaining to obtaining a quote for a vehicle sale. However, this is merely an example, and any other type of information may be provided to the input fields 616. The user interface 612 may also include an element 620 that may be selected to indicate that the information provided to the input fields 616 should be saved (e.g., sent to server 210 as depicted in FIG. 2). In some instances, and as depicted in FIG. 6B, the element 620 may be in the form of a "next" button. However, the element 620 may also be any other type of element that a user may interact with to indicate an intention to submit the information provided on the second page. Once the button is selected, a new set of input fields may be provided on a third page. The user interface 612, similar to the user interfaces 500 and 600, may include a section 622 identifying the portion of information that has already been provided to the information input session, and how much information is left to be provided to complete the entirety of the information input session. The section 622 may indicate that information for the input fields on any previous pages (for example, information associated with the first input fields 506, second input fields 508, and third input field 510, as well as the input fields 616) has already been provided.

Although FIGS. 5, 6A, and 6B only depict a total of three pages of input fields, any number of additional pages with any number of additional input fields may also be provided. Additionally, the user interfaces are only mere examples of a user interface a user may be presented with in order to provide information during an information input session. The input fields, elements (e.g., button), and any other component of the information input session may be displayed in any number of configurations. Additionally, while FIGS. 5, 6A, and 6B depict an information session input pertaining to a vehicle sale, any other information may be obtained through the input fields.

Figure 7:
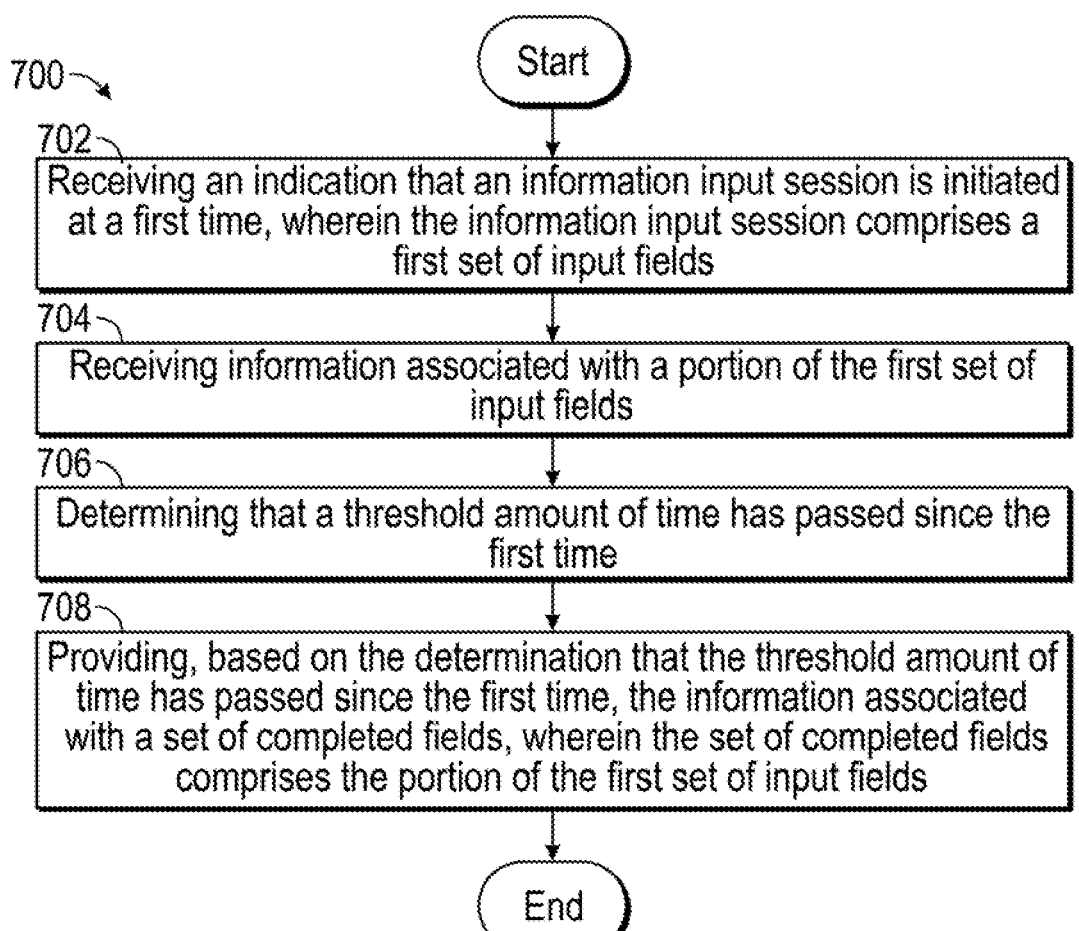
FIG. 7 depicts an example method flow in accordance with one or more example embodiments of the disclosure.

FIG. 7 is a flowchart of an example method of the present disclosure. In some embodiments, the method may include an operation 702 of receiving an indication that an information input session is initiated at a first time, wherein the information input session comprises a first set of input fields. In some embodiments, the indication that the information input session is initiated may be triggered by a user providing information for an preliminary set of input fields, and an element on the first page being selected, such as a "next" button, for example. At this point, a unique session identifier may be created for the information input session, and the unique session identifier, information provided for the first set of input fields, and a timer, may be saved. The timer may begin at the first time and may be in the form of a timestamp reflecting the first time. The timer may also be in any other form, for example the timer may simply be in the form of an incremental counter that begins at the first time.

In some embodiments, the method may include an operation 704 of receiving information associated with a portion of the first set of input fields. The first set of input fields may be the input fields presented after the user provides information for the preliminary set of input fields and the unique session identifier is created for the information input session. For example, in the vehicle trade-in advisor scenario, the first set of input fields may be directed to information about the vehicle the quote is being determined for. The first set of input fields may be directed to a particular subset of information pertaining to the vehicle, such as its make, model, and/or year. This is merely an example, however, and the first set of input fields may cover a wide range of information, and also does not to be limited to a vehicle trade-in advisor.

In some embodiments, the method may include an operation 706 of determining that a threshold amount of time has passed since the first time. The threshold amount of time passing may be an indication that a user has stopped providing information to the information input session for any number of reasons. For example, the user could have exited the information input session. The determination that the threshold amount of time has passed may be made based on the timer that is created every time a set of input fields are completed and an element is selected to indicate that a user desired to view a subsequent set of input fields. As disclosed herein, the timer may be in the form of a timestamp or an incremental counter, to list two examples.

In some embodiments, the method may include an operation 708 of providing, based on the determination that the threshold amount of time has passed since the first time, the information associated with a set of completed fields, wherein the set of completed fields comprises the portion of the first set of input fields. When the threshold amount of time has passed, it is determined that the user is likely not going to complete the information input session, and that the information that has already been provided should be salvaged to form a partial lead. Thus, the set(s) of input fields that have already been completed, as well as the information provided for the current set of input fields, should be collected and provided to generate a lead. This information may, for example, be provided to a lead generation system that takes the information as an input and generates a partial lead including the information as an output. The lead generation system may either be internal or external to the location at which the information is originally stored.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
   at least one processor; and
   at least one memory storing computer-executable instructions, that when executed by the at least one processor, cause the at least one processor to:
   receive an indication that an information input session is initiated at a first time, wherein the information input session comprises a first page including a first plurality of input fields and a second page including a second plurality of input fields;
   initiate a timer based on the indication that the information input session is initiated at the first time;
   receive first information associated with the first plurality of input fields;
   present, subsequent to receiving the first information, the second plurality of input fields;
   reset the timer based on the second plurality of input fields being presented;
   receive second information associated with a portion of the second plurality of input fields;
   determine, using the timer, that a threshold amount of time has passed since resetting the timer; and
   store, based on the determination that the threshold amount of time has passed since resetting the timer, the first information and the second information as a partial lead.

2. The system of claim 1, wherein the information input session comprises a lead generation session for purchase and/or sale of an item.

3. The system of claim 1, further comprising providing the partial lead to a lead delivery platform.

4. The system of claim 1, wherein the computer-executable instructions further cause the at least one processor to:
   save the first information received for the first plurality of input fields to a server.

5. The system of claim 4, wherein saving the first information received for the first plurality of input fields to a server comprises storing the information in a table associated with a unique session identifier for the information input session.

6. The system of claim 5, wherein the first time is also stored in the table associated with the unique session identifier for the information input session.

7. The system of claim 5, wherein saving the second information received for the second plurality of input fields to a server comprises storing the second information in the table associated with the unique session identifier for the information input session along with the first information for the first plurality of input fields.

8. The system of claim 1, wherein the computer-executable instructions further cause the at least one processor to:
   assign, based on a determination that a preliminary set of inputs have been received, a unique session identifier to the information input session.

9. A method comprising:
   receiving an indication that an information input session is initiated at a client device at a first time, wherein the information input session comprises a first page including a first plurality of input fields and a second page including a second plurality of input fields;
   initiating, at a server, a timer based on the indication that the information input session is initiated at the first time;
   receiving, at the server, first information associated with the first plurality of input fields;
   presenting, subsequent to receiving the first information, the second plurality of input fields at the client device;
   resetting, at the server, the timer based on the second plurality of input fields being presented;
   receiving, at the server, second information associated with a portion of the second plurality of input fields;
   determining, using the timer, that a threshold amount of time has passed since resetting the timer; and
   automatically providing, to a lead delivery platform located remotely from the server and based on the determination that the threshold amount of time has passed since resetting the timer, a partial lead including the first information and the second information located at the server.

10. The method of claim 9, wherein the information input session comprises a lead generation session for purchase and/or sale of an item.

11. The method of claim 10, further comprising:
    assigning a unique session identifier to the information input session.

12. The method of claim 9, further comprising:
    determining that information has been received for all input fields of the first plurality of input fields;
    saving the information received for the first plurality of input fields to a server;
    providing a second set of input fields at a second time;
    receiving information associated with a portion of the second set of input fields;
    determining that a threshold amount of time has passed since the second time; and
    sending, based on the determination that the threshold amount of time has passed since the second time, the information associated with a set of completed fields to a remote system, wherein the set of completed fields comprises the information associated with the first plurality of input fields and the information associated with the portion of the second set of input fields.

13. The method of claim 12, wherein saving the information received for the first plurality of input fields to a server comprises storing the information in a table associated with a unique session identifier for the information input session.

14. The method of claim 13, wherein the first time is also stored in the table associated with the unique session identifier for the information input session.

15. The method of claim 13, wherein saving the information received for the second set of input fields to a server comprises storing the information in the table associated with the unique session identifier for the information input session along with the information associated with the first plurality of input fields.

16. The method of claim 12, further comprising:
determining that information has been received for all input fields of the second set of input fields;
saving the information received for the second set of input fields to the server;
providing a third set of input fields at a third time;
receiving information associated with a portion of the third set of input fields;
determining that a threshold amount of time has passed since the third time; and
providing, based on the determination that the threshold amount of time has passed since the third time, the information associated with a set of completed fields to, wherein the set of completed fields comprises the information associated with the first plurality of input fields, the information associated with the second set of input fields, and the information associated with the portion of the third set of input fields.

17. A method comprising:
receiving an indication that an information input session is initiated at a first time, wherein the information input session comprises a first set of input fields presented at a client device on a first page and a second set of input fields presented at the client device on a second page;
initiating, at a server and based on a threshold amount of information being received at the client device during the information input session, a timer;
assigning, at the server, a unique session identifier to the information input session;
receiving, by the server, first information associated with the first set of input fields;
presenting, subsequent to receiving the first information, the second set of input fields;
resetting, by the server and based on the second set of input fields being presented, the timer;
receiving, by the server, second information associated with a portion of the second set of input fields;
determining, using the timer, that a threshold amount of time has passed since resetting the timer; and
sending, by the server and based on the determination that the threshold amount of time has passed since resetting the timer, a partial lead including the first information and the second information to a lead delivery platform located remotely from the server.

18. The method of claim 17, further comprising:
determining that information has been received for all input fields of the first set of input fields;
determine an input has been received indicating a transition from the first page to the second page;
saving the information received for the first set of input fields to a lead table on a server;
displaying the second page including the second set of input fields at a second time;
receiving information associated with a portion of the second set of input fields;
determining that a threshold amount of time has passed since the second time; and
sending, based on the determination that the threshold amount of time has passed since the second time, the information associated with a set of completed fields to the lead delivery platform, wherein the set of completed fields comprises the information associated with the first set of input fields and the information associated with the portion of the second set of input fields.

19. The method of claim 17, wherein the information input session comprises a lead generation session for purchase and/or sale of an item.

* * * * *